United States Patent [19]
O'Donnell et al.

[11] Patent Number: 6,023,773
[45] Date of Patent: Feb. 8, 2000

[54] MULTI-CLIENT TEST HARNESS

[75] Inventors: Michael D. O'Donnell, Austin; Danny B. Gross, Bastrop; Gene R. Toomey, Kyle, all of Tex.

[73] Assignee: Advanced Micro Devices, Inc., Sunnyvale, Calif.

[21] Appl. No.: 08/866,728

[22] Filed: May 29, 1997

[51] Int. Cl.⁷ ........................................ G06F 11/00
[52] U.S. Cl. ................................ 714/40; 714/11
[58] Field of Search ................ 398/183.16, 183.14, 398/183.19, 184.01, 182.02, 182.09, 182.1, 183.07, 187.01, 575; 364/579, 551.01; 714/40, 11, 12, 17, 25, 31, 37; 395/704, 916

[56] References Cited

U.S. PATENT DOCUMENTS

| | | | |
|---|---|---|---|
| 4,958,273 | 9/1990 | Anderson et al. | 364/200 |
| 5,155,847 | 10/1992 | Kirouac et al. | 395/600 |
| 5,371,883 | 12/1994 | Gross et al. | 395/575 |
| 5,421,004 | 5/1995 | Carpenter et al. | 395/575 |
| 5,629,878 | 5/1997 | Kobrosly | 364/579 |
| 5,659,547 | 8/1997 | Scarr et al. | 395/182.02 |
| 5,669,000 | 9/1997 | Jessen et al. | 395/704 |
| 5,671,351 | 9/1997 | Wild et al. | 395/183.14 |
| 5,673,388 | 9/1997 | Murthi et al. | 395/183.18 |
| 5,751,941 | 5/1998 | Hinds et al. | 395/183.14 |
| 5,790,425 | 8/1998 | Wagle | 364/551.01 |

*Primary Examiner*—Robert W. Beausoliel, Jr.
*Assistant Examiner*—Nadeem Iqbal
*Attorney, Agent, or Firm*—Skjerven, Morrill, MacPherson, Franklin & Friel LLP; William W. Holloway

[57] ABSTRACT

A multi-client test harness for testing first and second computer systems by executing a first test case on the first and second computer systems. The multi-client test harness includes a scheduler module. The scheduler module initiates execution of the first test case on the first computer system and the second computer system responsive to attest initiation event. The scheduler module synchronizes the execution of the first test case on the first and second computer systems such that the first test case executes on the first computer system at substantially the same time that the first test case executes on the second computer system.

28 Claims, 5 Drawing Sheets

MULTI-CLIENT TEST HARNESS

CROSS-REFERENCE TO RELATED APPLICATIONS

This application relates to co-pending U.S. application Ser. No. 08/866,729, filed on an even date herewith, entitled "Testing the Sharing of Stored Computer Information", naming Michael D. O'Donnell, Danny B. Gross and Gene R Toomey as inventors, and which is incorporated herein by reference.

BACKGROUND

1. Field of the Invention

The present invention relates to computer systems, and, more particularly, to testing computer systems in a client/server environment.

2. Description of the Related Art

Computer systems are information handling systems which can be designed to give independent computing power to one user or a plurality of users. Computer systems have attained widespread use in providing computer power to many businesses and institutions. Some important fields in which computer systems have become common include manufacturing monitoring and control; electrical, mechanical, and chemical system design and simulation; and network management and service. Productive processing time is of great importance to the users of computer systems in these and other fields because computer system down time can result in significant costs.

Computer systems are designed to provide a degree of system availability that is necessitated by the applications for which the computer system is intended. High availability (HA) computer systems, as their name implies, are required to be available, or "on," virtually all of the time. Such computer systems (or networks of such computer systems) should be substantially error free or should be capable of recovery from errors. Because computer systems having different hardware and software configurations are often required to interact in various applications, the computer systems should be tested for interactive compatibility prior to their implementation in high cost applications.

Computer systems are often tested using a series of programmable test cases. In one method of testing, the test cases model the input/output (I/O) of the computer system being tested, thereby testing the computer system's functionality and interaction with users and other computer systems. Test cases are often combined into sets of test cases called test suites that are executed by test scripts. Each test suite can exhaustively test an individual facet of a computer system. Multiple test suites can test entire computer systems.

Tools for multi-test execution support are called test harnesses. A test harness directs the execution of test suites and records data from the computer system that is generated as a result of the test cases executed. Test cases are typically run in sequence by the test harness and are easily repeatable when the test harness is used. The test suite may be repeated on a computer system after a specific test case is edited, after the computer system is altered, or after an error occurs with the computer system. Also, the test may be run on separate computer systems, and the results may then be compared to determine system compatibility. Test harnesses such as the International Business Machines (IBM) System Integration Test Bucket (SITB) and the Open Software Foundation (OSF) Test Environment Tool (TET) can perform regression and functional testing on a single system.

If multiple computer systems are required for a particular application, testing is usually performed on each computer system individually. However, because multiple computer system networks such as client/server systems have become common in a variety of computer system applications, a method for incorporating multiple test clients into the test environment is desired.

SUMMARY

It has been discovered that multiple computer systems may be incorporated into a test environment by providing a multiple client test harness. The multiple client test harness allows multiple computer systems to participate in a test environment in a synchronized and controlled fashion. Also, the multiple client test harness allows the testing of networks of computer systems prior to deployment of the computer systems in a production environment including networked computer systems.

In one embodiment of the present invention, a multi-client test harness is provided to test first and second computer systems by executing a first test case on the first and second computer systems. The multi-client test harness includes a scheduler module. The scheduler module initiates execution of the first test case on the first computer system and the second computer system responsive to a test initiation event. The scheduler module synchronizes the execution of the first test case on the first and second computer systems such that the first test case executes on the first computer system at substantially the same time that the first test case executes on the second computer system.

In another embodiment of the invention, a method of testing compatibility of a first computer system with a second computer system is provided. The method includes providing a test harness on one of a plurality of computer systems. The plurality of computer systems includes the first computer system and the second computer system. Each of the plurality of computer systems is coupled to another of the plurality of computer systems. The test harness tests compatibility of the first computer system with the second computer system by initiating execution of a test case on the first and second computer systems in a synchronized manner responsive to a test initiation input.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The following sets forth a detailed description of a preferred embodiment. The description is intended to be illustrative of the invention and should not be taken to be limiting. Many variations, modifications, additions, and improvements may fall within the scope of the invention as defined in the claims that follow.

In one embodiment of the invention, a test harness is provided on a computer system, typically a server, which is referred to as the control system. A test suite is provided for execution by the test harness. The test harness includes a synchronization component to coordinate and synchronize the execution of individual test cases on separate test client computer systems. A computer system that is being tested is a test client or a client of the control system even if the computer system being tested is a server during normal operation. A test client can be one of several applications to be tested on a computer system. The test harness on the control system schedules and executes the individual test cases on multiple test clients attached to the control system. Thus, the test harness provides a framework for testing client/server applications in the client/server environment. For example, the test harness can be programmed to execute regression or functional test cases to test the interaction of clients and servers in a client/server system with a new client or server that is added to the already existing client/server system.

Figure 1:
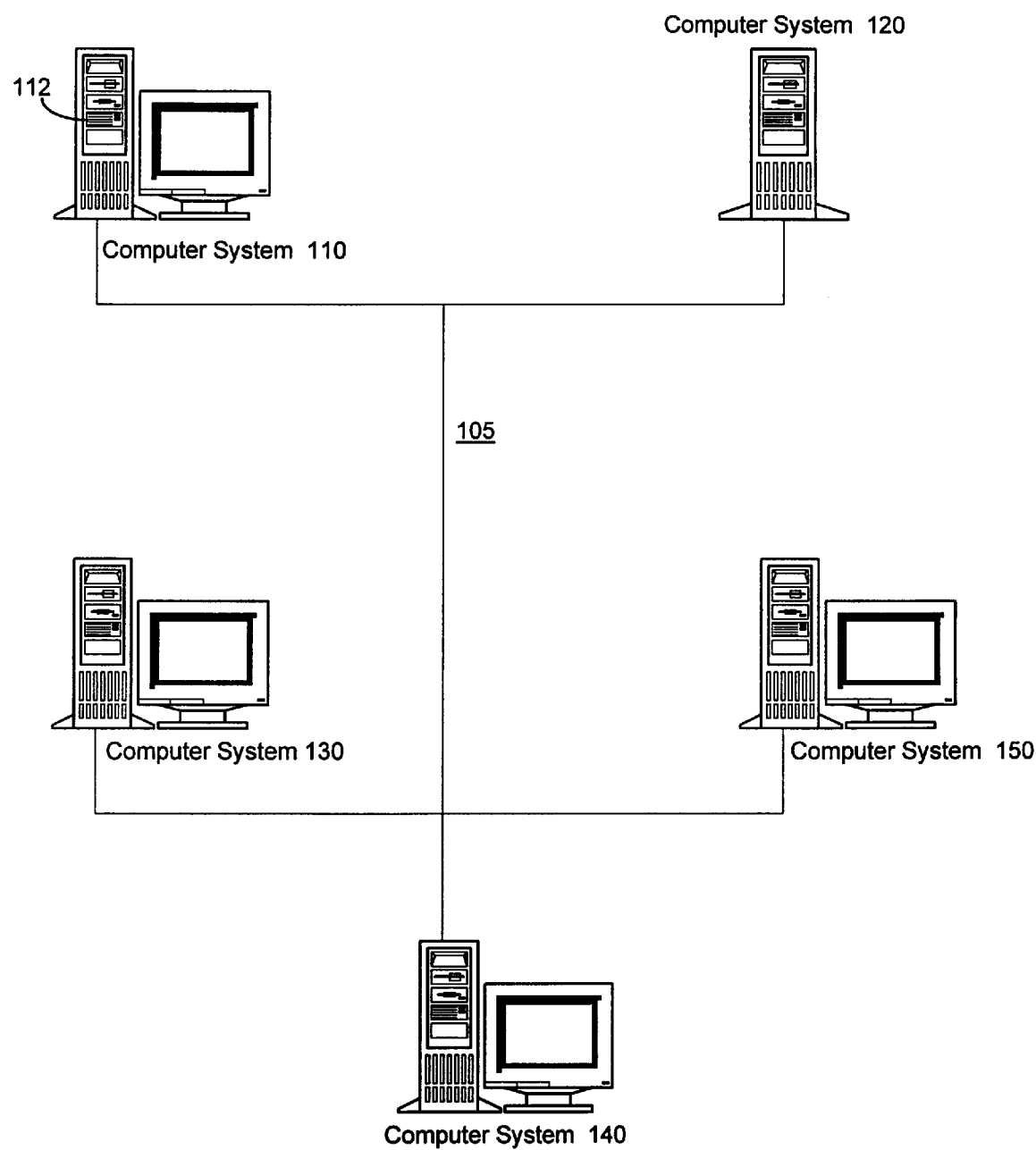
FIG. 1 shows a block diagram of an exemplary computer network according to an embodiment of the invention.

FIG. 1 depicts an exemplary computer network 100 in accordance with an embodiment of the invention. Computer network 100 includes various computer systems coupled within a distributed computing environment. For example, computer network 100 includes computer systems 110, 120, 130, 140 and 150. Computer systems 110–150 are coupled together via Ethernet connection 105. In this exemplary embodiment, computer system 110 manages the file systems for computer network 100 and is referred to hereinafter as file server 110. Also, computer systems 130, 140 and 150 are application servers. Computer system 120 can be an application server, database server or some other type of computer system. File server 110 stores data files, executable files and other files used by application servers 130, 140 and 150. File server 110 provides the files to the application servers 130, 140 and 150. Application servers 130, 140 and 150 access the files using the network file server (NFS) protocol. In one embodiment, application servers 130, 140 and 150 provide an interface for users to access the information stored on file server 110 and/or a database server 120 to drive a manufacturing process. In other embodiments, computer systems 130, 140 and 150 may take a different form and may be for a different purpose. For example, application servers 130, 140 and 150 may provide for workstations for users in a system design or business office environment.

In other embodiments, computer network 100 may include additional or fewer computer systems. For example, application servers 130, 140 and 150 may interact without file server 110, or there may be a different number of application servers. Also, the functionality of the various computer systems may differ from the computer systems of exemplary computer network 100. Network 100 may include additional computer systems of different types or combinations, or the functions of several of the servers may be combined into fewer servers or a single server.

Although file server 110 and application servers 130, 140 and 150 are coupled via Ethernet connection 105 in the embodiment of FIG. 1, any appropriate connection such as a fiber distributed data interface (FDDI) may be used in accordance with the invention. Also, although application servers 130, 140 and 150 access files on file server 110 using NFS protocol in the embodiment of FIG. 1, other appropriate methods of making the data files available to application servers 130, 140 and 150 may be used in accordance with the invention. For example, files may be duplicated on the application servers 130, 140 and 150.

Figure 2:
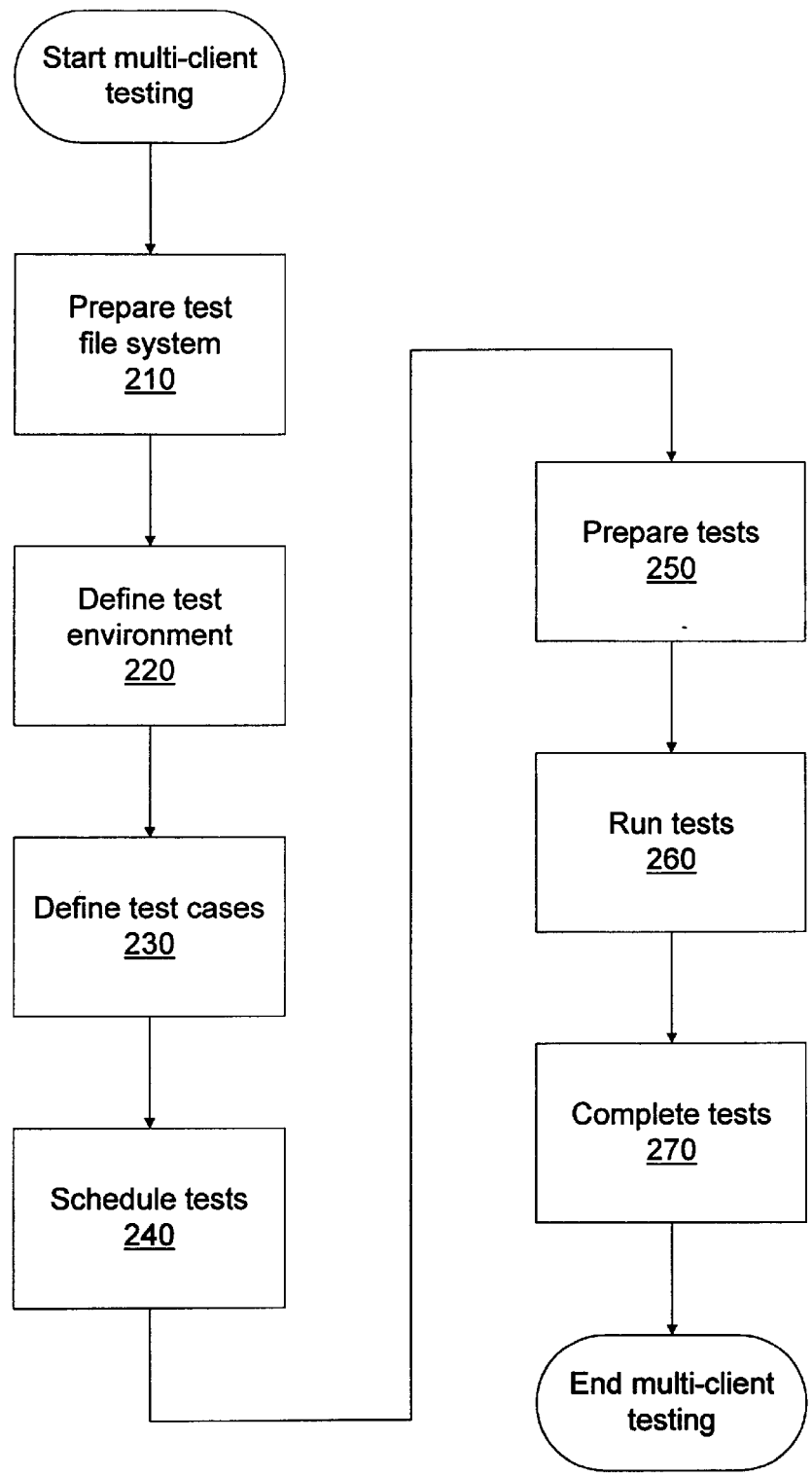
FIG. 2 shows a flow chart for testing multiple clients according to an embodiment of the invention.

FIG. 2 depicts a flow chart of the operation of a module and method for testing multiple clients according to an embodiment of the invention. It is appreciated that modules discussed herein may consist of directly entered commands by a computer system user or by steps executed by application specific hardware modules, but the preferred embodiment includes steps executed by software modules. The steps referred to herein may be modules or portions of modules. Furthermore, it is appreciated that the software modules discussed herein may include script, batch or other executable files.

The software modules may be stored on machine-readable or computer-readable storage media such as storage device 112 of computer system 110. Storage device 112 may be a magnetic floppy or hard disk or an optical disk such as CD-ROM, CD-R or DVD, for example. Storage device 112 may be a tape drive. Storage device 112 may also be a semiconductor-based memory such as a FLASH memory, EEPROM, EPROM, ROM or RAM, and may be permanently, removably or remotely coupled to computer system 110. Thus, the software modules may be stored within a computer system memory to configure the computer system to perform the functions of the module. Other new and various types of computer-readable storage media may be used to store the software modules discussed herein.

At prepare test file system step 210, a test file system is prepared for the construction of the multi-client test suite and test harness. Specifically, the test file system is created and made available to all of the clients. In one embodiment, the test file system resides on the file server and is NFS mounted to all of the clients. In another embodiment, the test file system is installed on each individual client. The nature of the test case environment will dictate where the test file system should reside.

In one embodiment of prepare test file system step 210, the following directories are created within the file system: bin, tests, log, templates, nfs.lockfiles, and doc. The bin directory provides a location for applications and configuration files. For example, the env. config file is used to set up the ad various environment variables used for the test. The tests directory provides a location for the actual test cases. The log directory provides an output location for the results of the test cases. The templates directory provides a location for copies of standard files such as different sized files upon which the various test cases will operate. The nfs.lockfiles directory provides a location for client synchronization files. The doc directory provides a location for test harness documentation.

Control then transitions to define test environment step 220. During define test environment step 220, the configuration files are edited to define the actual test environment For example, the env.config file located in the bin directory is edited to define the various environment variables used by the test harness. The variable test root points to the root directory of the test environment directory tree where the test software should be installed. The test root variable is used for referencing directories located within or below the directory indicated by test root. For example, /$test root/ test1 references the directory labeled test1 under the directory pointed to by the variable test root. The test case numbers to be executed in the next test run are provided by the variable testcases. The variable testcases is an an array of test case numbers. The use of the testcases variable allows certain tests to be turned off during debug by removing them from the array. Once all of the test cases are debugged, all are included in the complete test suite. The names of the clients to be tested are defined by the variables client_1 through client_n.

Control then transitions to define test cases step 230. During define test cases step 230, a directory is created for the test harness and for each test case to be run by the test harness. In one embodiment, the test harness directory is labeled with the numeral 0, and the test case directories are labeled in sequential numerical order beginning with 1. The testcases variable contains the names (values) of these directories and is used to determine which cases are to be run and in which order the cases are to be run. Thus, in one embodiment, the variable testcases is an array of directory names in which a pointer moves from one name to the next to provide the name of the next test case. Other test case directory labeling techniques may also be used in accordance with the invention. For example, in another embodiment, when the first test case is called, the testcases variable provides a value identifying the first test case. When the next test case is called, the value of the testcases variable is incremented to identify the next test case.

In one embodiment of define test case s step 230, a test case is created by creating the numerically labeled test directory and instlling five files into the directory: setup, pre_test, runtest, post_test, and cleanup. The setup script is used to create the files and data used to synchronize each run of a test suite. A copy of the setup script can be retrieved from the test case 0 directory. If no changes are required to this file then a symbolic link can be created to the test case 0 copy. The pre_test script performs required setup for each test case within the test suite. For example, if a test case requires a certain file be present for that test case to run, the pre_test script creates the required file. The runtest file defines the actual test case. In the runtest file, a case statement defines what work each configured client in the environment should perform during the corresponding test case. The post_test script is run after each test case is complete and performs any cleanup or other actions required by the specific test case just completed. The post_test script substantially restores the computer systems tested to a pre-test state. For example, files created for the test are deleted (except for files needed to report test results) so that the computer systems can be returned to the operating status that existed prior to the test. If another test is to be executed, new files may be created, but at the end of the last test the computer system can be returned to its pretest operating status because all of the test files and configurations have been deleted or deactivated. The cleanup script reconciles the files and data used for test case synchronization (e.g., the files and data created by the setup script). The cleanup script can also be copied or linked from the cleanup file in the test case 0 directory.

Once the test harness is configured and the test suite populated as set forth above, control transitions to schedule tests step 240. During schedule tests step 240, the tests are scheduled by preparing a script in the bin directory named sched. The sched script is used to schedule a test run which typically includes a number of test cases within a test suite. The numerically labeled test directories each provide a test case in the test suite to be run by sched. The sched script directs the execution all of the files found in the test suite and, in one embodiment, uses the testcases variable to ensure that the test cases are executed in the proper order.

Control then transitions to prepare tests step 250. During prepare tests step 250, the necessary preparations for the test cases are executed by the sched script. Each test case within the test suite contains its own setup file. The sched script performs a global setup for the next test suite to be run by executing all of the setup scripts which correspond to the test cases within the test suite. The sched script executes responsive to an initiation input (from, e.g., a user or another computer system) to the computer system including the test harness (e.g., file server 110). The setup scripts are executed in succession. Once all of the setup scripts are executed, the tests are ready for execution.

Control then transitions to run tests step 260. During run tests step 260, the tests are executed in succession. To execute each test, the sched script executes the corresponding pre_test script, executes the test case, and executes the corresponding post_test script. The runtest script tests a specific function or performs regression testing of the computer system on which it runs. For example, any of various system administrator tasks may be tested by testing performance and compatibility of, e.g., backup scripts or cleanup scripts. The use of test cases is well known in the art. When the scheduled test cases begin running, each client executes the tasks that the clients are configured to perform.

Data created by each test case script is output into a log file found in the log directory. Each test harness run creates a unique log directory so that no run will overwrite the data from a previous run, and creates a log file for each for each test case run on each client. For example, for test harness run one, a log file for client one, test case one is referenced by log/1/1.1.log; a log file for client one, test case two is referenced by log/1/1.2. log; and a log file for client two, test case one is referenced by log/1/2.1.log. For test harness run two, a log file for client one, test case 1 is referenced by log/2/1.1.log. In other embodiments, other file references may be used in accordance with the invention. Also, in other embodiments, data from test harness runs may be logged by other methods such as compiling arrays of data for each test run.

Control then transitions to complete tests step 270. During complete tests step 270, the test cases are completed. After all of the tests in the test suite are executed, the sched script executes a global cleanup consisting of all of the cleanup scripts corresponding to the test cases in the test suite that were executed. The cleanup scripts are executed in succession. After the global cleanup is performed, the test suite run is complete.

During the run tests step 260 discussed above, a test case must complete on all clients before any client can proceed to the next test case. In one embodiment, a synchronizer is an integral portion of the test harness and synchronizes the execution of the test cases on the clients to ensure that the test cases are executed at the proper times. In other embodiments, a synchronizer interacts with the test harness to provide a method of synchronized testing of the computer systems within the client/server network. Various methods may be used to synchronize test case execution. For example, if multiple test cases are being executed on multiple computer systems, the synchronizer can ensure that the test cases are executed at substantially the same time. In one embodiment, substantially the same time is, for example, within one second of each of the test cases executing. In other embodiments, tighter precision may be desired, and the test cases may execute within 10–50 milliseconds of each other by synchronizing system clocks and scheduling precise start times. Other embodiments may allow concurrent execution within 1–5 seconds. Various factors affect the amount of synchronization required. Such factors include the amount of computer processing load, the type and efficiency of network connections and the type and length of the tests to be run.

Figure 3:
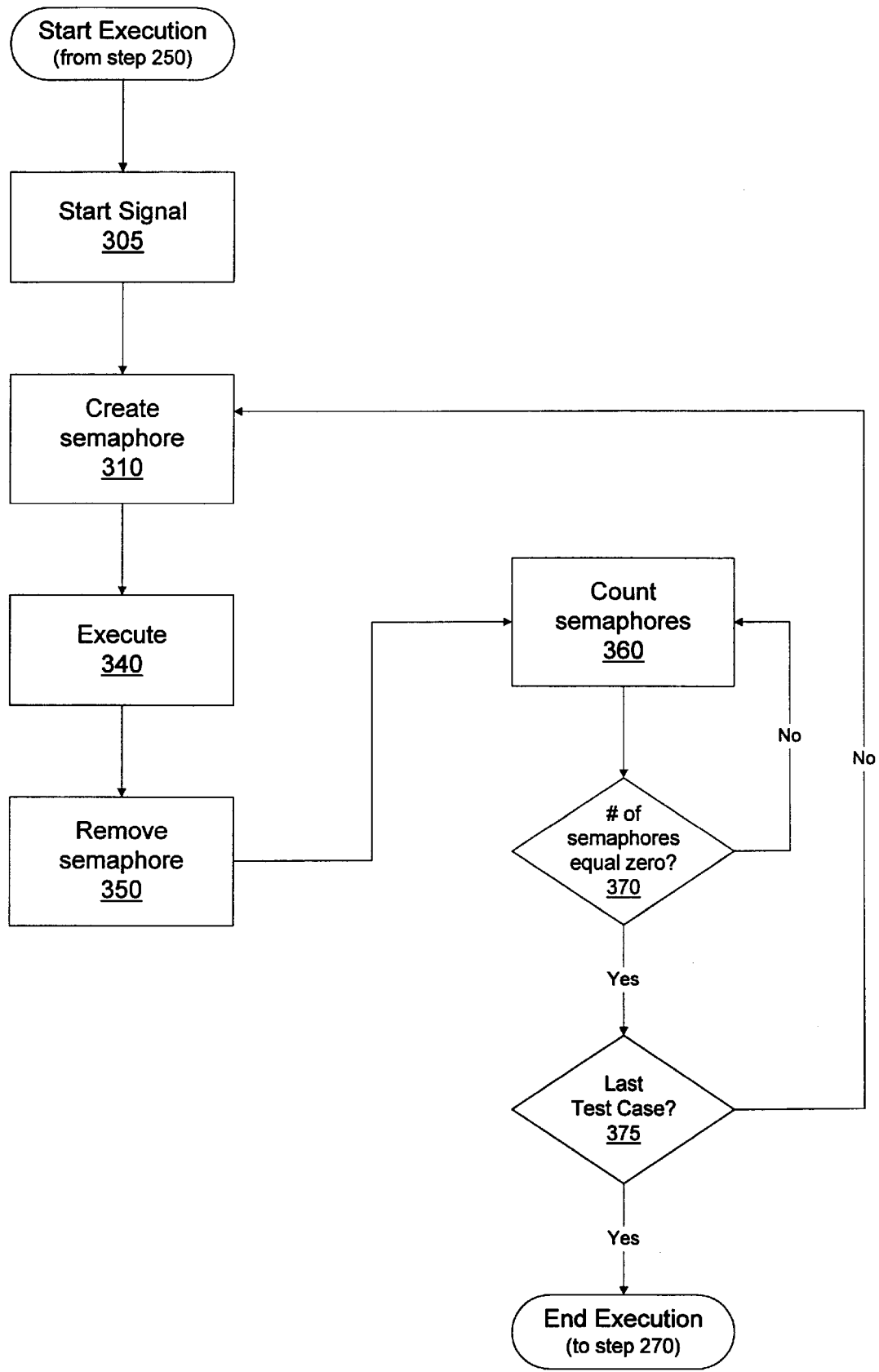
FIG. 3 shows a flow chart for synchronizing multiple client testing according to an embodiment of the invention.

FIG. 3 depicts a flow chart showing one embodiment of a synchronization method. The synchronization method enables the test harness to implement multi-client testing by synchronizing the actions of multiple clients in accordance with the requirements of the test harness. The synchronization method ensures that each test case completes on all clients before any client proceeds to the next test case. In one embodiment, the steps of the synchronization method are software modules stored on disk drive 112 of computer system 110. In other embodiments, the software modules or portions of the software modules are stored on other disk drives.

One embodiment of a method of synchronization uses NFS accessible files as semaphores and has each client test against the semaphore files. For example, each client creates a resident semaphore file prior to the execution of each test case. When all of the clients have created a resident semaphore file corresponding to the test case to be run, processing of the test case may proceed. When a client completes execution of the test case, the client removes its resident semaphore file. The removal of all semaphore files for a particular test case indicates that the last client has completed execution of the test case. When all the semaphore files for a particular test case have been removed, the clients may proceed to the next test case.

Referring to FIG. 3, at start signal step 305, a signal is provided to all test clients indicating when the first test case is to be executed. For example, application servers 130, 140 and 150 are test clients of file server 110, which is the control system embodying the test harness. Application servers 130, 140 and 150 are tested according to the semaphore embodiment of the invention. File server 110 sends the following command to application servers 130, 140 and 150:

at now +1 minute <execute_test> wherein the application servers are ordered to begin the test runs one minute from the issuance of the at command.

Control then transitions to create semaphore step 310. During create semaphore step 310, a semaphore indicating a particular client and a particular test lcase is created. For example, application server 130 creates a semaphore on file server 110 indicating that application server 130 is ready execute test case 1. Application server 130 creates the semaphore during run tests step 260 after the pre_test script has been executed for test case 1. Application servers 140 and 150 also create semaphores on file server 110 indicating that application servers 140 and 150 are ready execute test case 1. Each semaphore is readable by all application servers being tested.

Control then transitions to execute step 340. During execute step 340, the current test case is executed on each client. For example, application servers 130, 140 and 150 begin executing test case 1.

When a client completes execution of the current test case, control transitions to remove semaphore step 350. During remove semaphore step 350, the client removes the semaphore that the client created at create semaphore step 310. In the current example, application server 130 removes the semaphore file that it created prior to executing test case 1.

Control then transitions to count semaphores step 360. During count semaphores step 360, each client being tested counts the number of semaphore files in existence on the control server with the test harness. For example, application server 130 counts the number of semaphore files in existence on file server 110. If application servers 140 and 150 have not completed remove step 350, then application server 130 counts two semaphores. If application server 140 has completed remove step 350 but application server 150 has not, application server 130 counts one semaphore. If both application server 140 and application server 150 have already completed remove step 350, application server 130 counts zero semaphores.

Control then transitions to decision step 370. During decision step 370, each client (e.g., application server 130) determines whether the number of semaphore files in existence is equal to zero. If the number of semaphore files in existence does not equal zero ("No"), control transitions to count semaphores step 360. The loop (e.g., steps 360 and 370) is repeated until the number of semaphore files in existence equals zero. (One embodiment of the invention may include a timing entity that begins timing when the client enters the loop and forces the client to exit the loop if a predetermined or user-programmed amount of time has elapsed while the client is in the loop.) If the number of semaphore files in existence equals zero ("Yes"), test case 1 has completed on all of application servers 130, 140 and 150, and the loop is exited.

Control then transitions to decision step 375. During decision step 375, the client determines if there are fiurther test cases pending for execution. If the last test cases has not been executed ("No"), control transitions to create semaphore state 310, and the client may begin the process again for the next test case. For example, application server 130 may begin executing test case 2 (if test case 2 is the next test case in the sched script) by creating a semaphore for test case 2. When all test cases are complete ("Yes"), control transitions to complete tests step 270 (FIG. 2).

Figure 4:
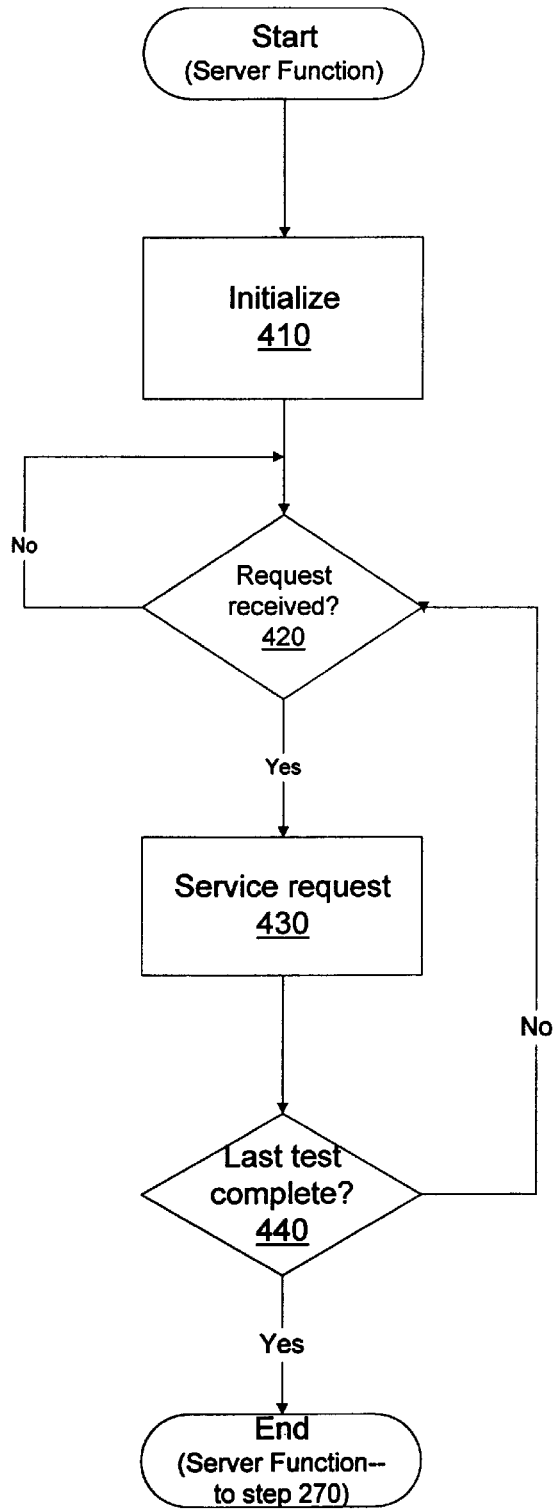
FIG. 4 shows a flow chart depicting server functionality during synchronized multiple client testing according to an embodiment of the invention.
Figure 5:
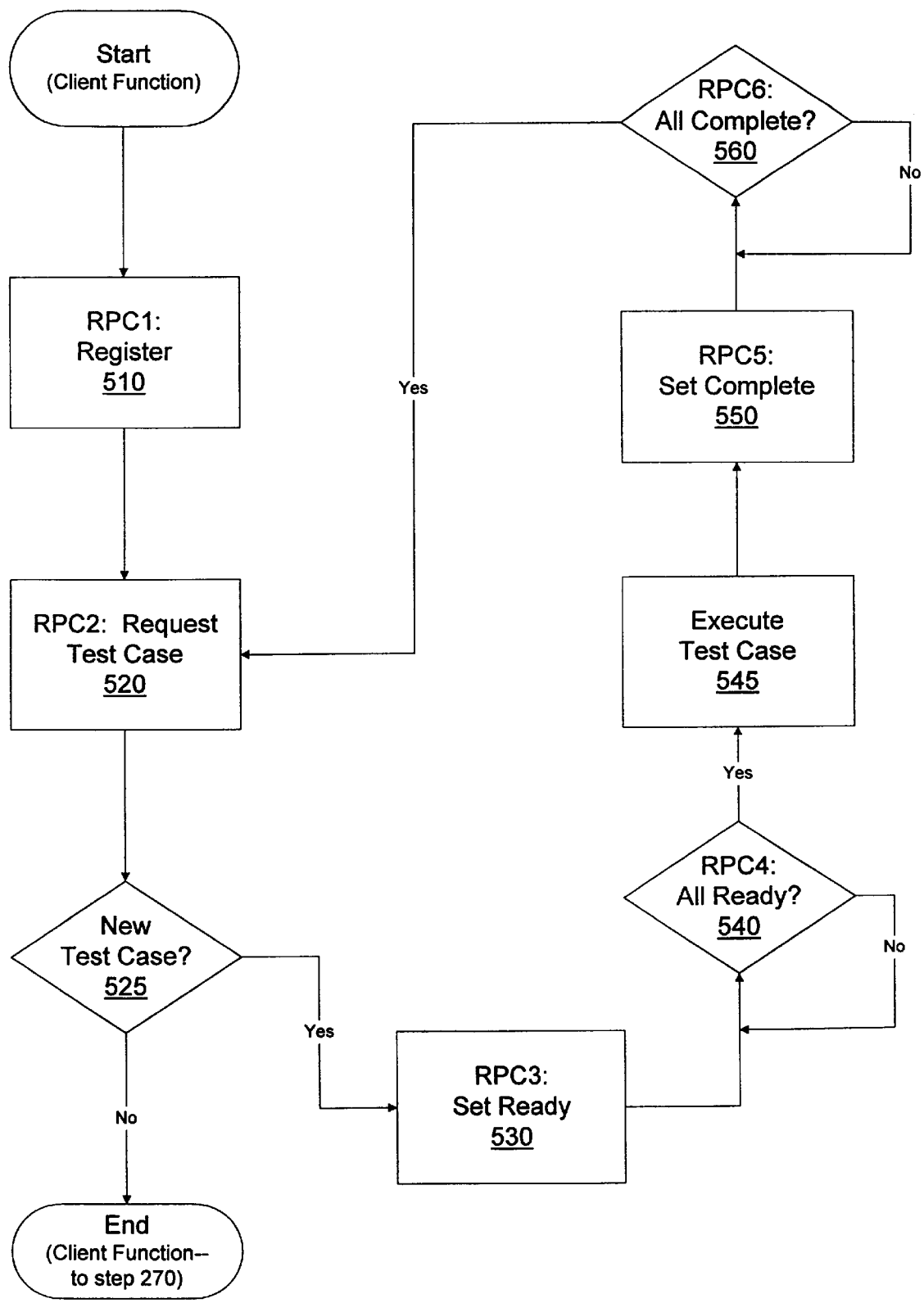
FIG. 5 shows a flow chart depicting client functionality during synchronized multiple client testing according to an embodiment of the invention.

Referring to FIGS. 4 and 5, another embodiment of a method of synchronization uses a status server program (synchronizer) on the control system (e.g., file system 110) which maintains a state table for each client (e.g., application servers 130, 140, 150) configured into the test environment. Each client queries the server for status information and processing requests. The status server method embodiment provides tighter timing requirements than the semaphore file method embodiment. In the status server method embodiment, clients can communicate with each other to share data and information used to coordinate the tests. The clients and the status server use remote procedure calls (RPCs) to communicate with each other.

FIG. 4 shows the flnction of the status server in the status server method embodiment. At initialize state 410, data structures of the status server are initialized for recording the state of each client. For example, referring to FIG. 1, application servers 130, 140 and 150 are clients of file server 110, which is the control system embodying the test harness. Application servers 130, 140 and 150 are tested according to the status server embodiment of the invention. File server 110 is initialized to record the state of application servers 130, 140 and 150. Initialize step 410 could take place during prepare tests step 250 or during run tests step 260 (FIG. 2).

Control then transitions to receive request step 420. During receive request step 420, the status server waits to receive requests from computer systems to be tested. For example, file server 110 waits to receive requests from application servers 130, 140 and 150.

When a request is received from a client ("Yes"), control transitions to service request step 430. During service request step 430, the status server (e.g., file server 110) provides a reply to the client request (from e.g., application server 130, 140 or 150). Client requests are provided to the status server from the computer systems being tested via remote procedure calls (RPCs) discussed below in reference to FIG. 5.

Control then transitions to decision step 440. During decision step 440, the status server (e.g., file server 110) checks whether the last test case is complete (e.g., by checking the variable testcases). If the last test case is not complete ("No"), control transitions to request state 420 whereupon the status server awaits further requests from the computer systems being tested. If the last test case is complete on all application servers ("Yes"), control transitions to complete tests step 270 (FIG. 2).

The status server (also called the control system) recognizes several remote procedure calls (RPCs) while in the request loop (i.e., steps 420, 430 and 440). RPCs are software modules accessible by the various computer systems. RPCs are issued from the test clients to the control system so that each test client may perform the test cases at the proper time. For example, application servers 130, 140 and 150 issue RPCs to file server 110. Exemplary RPCs are shown in the Table 1.

TABLE 1

| | |
|---|---|
| RPC1 | Register client with status server |
| RPC2 | Request current test case number |
| RPC3 | Set client ready status |
| RPC4 | Request ready status of other clients |
| RPC5 | Set client event completed |
| RPC6 | Request completion status of other clients |

In other embodiments, other RPCs may be used in accordance with the invention. Also, RPCs may be combined. For example, RPC3 and RPC4 could be combined into a single RPC.

FIG. 5 shows the function of a representative test client being tested with the status server method embodiment of the invention. For example, at register step 510, application system 130 issues RPC1 to register with file server 110. Registration with file server 110 performs the initial setup of application server 130 and provides file server 110 with the data necessary to be able to track the state of application server 130. Each test client issues RPC1 to register with the status server. For example, application servers 140 and 150 each register with file server 110 by issuing RPC1.

Control then transitions to request test case step 520. During request test case step 520, application server 130 issues RPC2 to file server 110 requesting the number of the test case to be executed.

Control then transitions to decision step 525. During decision step 525, application server 130 determines whether a test case is received from status server 110. If no test case is forthcoming from status server 110 ("No"), then test case execution is complete and control transitions to complete tests step 270. If a test case is received by application server 130 ("Yes"), control transitions to set ready step 530. In the one embodiment, application server 130 determines that test case execution has completed when application server 130 receives a test case number of "−1" (minus one) since zero is a valid test case number.

During set ready step 530, application server 130 issues RPC3 to file server 110 indicating to file server 110 that application server 130 is ready to execute the test case.

Control then transitions to ready decision step 540. During ready decision step 540, application server 130 issues RPC4 requesting the status of other clients to be tested (e.g., application servers 140 and 150). RPC4 allows application server 130 to ask file server 110 if all clients are ready to proceed with the current test case. If file ever 110 replies to RPC4 by indicating that all clients are not ready ("No"), then application server 130 waits and retries RPC4.

If file server 110 replies to RPC4 by indicating that all clients are ready ("Yes"), control transitions to execute test cases step 545. During execute test cases step 545, application server 130 executes the current test case as indicated by the test case number received at step 525.

Control then transitions to set complete step 550. During set complete step 550, application server 130 issues RPC5 indicating to file server 110 that application server 130 has completed the execution phase of the current test case. Each application server issues RPC5 when the respective application server completes the execution of the test case.

Control then transitions to all complete decision step 560. During all complete decision step 560, application server 130 issues RPC6 requesting the status of other clients to be tested (e.g., application servers 140 and 150). RPC6 allows application server 130 to ask file server 110 if all clients have completed the current test case. If file server 110 replies to RPC6 by indicating that all clients have completed the current test case ("Yes"), then control transitions to request test case step 520 and application server 130 requests the next test case via RPC2. If file server 110 replies to RPC6 by indicating that all clients have not completed the current test case ("No"), then application server 130 waits and reissues RPC6. In one embodiment, the value returned by file server 110 in response to RPC6 is the number of clients still performing the execution phase of a test case. If this value is zero, then all clients have completed the execution phase and each client may proceed to the next test case as indicated in the sched script.

Other finctions can be added to the status server embodiment and other embodiments of the invention. Additional functions include but are not limited to, time synchronization of requests, request of actual instructions, and control messages to terminate or manipulate tests. For example, the time synchronization function allows a test client to query the status server so that test client can adjust its own clock to match the clock of the status server. The request instruction function allows instructions to be passed from the status server to a test client responsive to an instruction request call. The request instruction function is particularly useful in cases in which a client encounters a problem and needs to know how to handle an exception. The control messages function allows termination of tests in the event a problem is encountered in the test cases. Instead of running to completion, the status server could instruct the test clients to terminate testing. Also, test manipulation is helpful when the number of clients is large. Test manipulation refers to the ability to reconfigure specifics about tests, to change the order of tests or to restart certain tests in the event of a failure.

While the invention has been described with reference to various embodiments, it will be understood that these embodiments are illustrative and that the scope of the invention is not limited to them. Many variations, modifications, additions, and improvements of the embodiments described are possible in accordance with the invention.

For example, although the test harness has been described in the context of a UNIX based operating system, any suitable operating systems may be used. Also, those skilled in the art will recognize that the test suite described herein is merely illustrative and a variety of additional and/or alternative test techniques may be analogously provided in accordance with the present invention. Furthermore, the steps given in the exemplary embodiment are for illustration only. Steps may be combined or the functionality of each step may be distributed to additional steps in accordance with the invention. Modifications to the above file system, variables, test cases and execution scripts will be apparent to those skilled in the art Additionally, those skilled in the art will recognize that although the functions of the above referenced modules are performed by software modules in the present embodiment, other types of modules may be used such as application specific hardware modules and configured hardware modules. Also, the boundaries between modules are merely illustrative and alternative embodiments may merge modules or impose an alternate decomposition of functionality of modules. For example, a pre-test module for a first test case and a pre-test module for a second test case may be merged into a single pre-test module having first and second test case pre-test portions. Alternatively, a software module for calling submodules may be decomposed so that each submodule performs its function and passes control directly to another submodule. Moreover, alternative embodiments may combine multiple instances of a particular component.

These and other variations, modifications, additions, and improvements may fall within the scope of the invention as defined in the claims which follow.

What is claimed is:

1. A multi-client test harness for testing a plurality of computer systems by executing a a plurality of test cases on the plurality of computer systems, the multi-client test harness stored on a computer-readable storage medium coupled to at least one of the plurality of computer systems, the multi-client test harness comprising a scheduler module, the scheduler module initiating execution of a selected test case on each of the plurality of computer systems in response to a test initiation event, the scheduler module synchronizing the execution of the selected test case on the plurality of computer systems such that the selected test case executes on all the plurality of computer systems at a substantially same time, wherein testing of a next test case does not continue until execution of the selected test case on the plurality of computer systems is complete.

2. The multi-client test harness of claim 1 wherein the selected test case comprises:

a pre-test module, the pre-test module performing a selected test case setup procedure responsive to the selected test case being initiated by the scheduler module, the setup procedure preparing the plurality of computer systems for execution of the selected test case; and a run test module, the run test module executing a test responsive to being accessed by the scheduler module, the scheduler module accessing the run test module upon completion of the selected test case setup procedure by the pre-test module.

3. The multi-client test harness of claim 2 wherein the selected test case further comprises a post-test module, the post-test module substantially restoring the first and second computer systems to a pre-test state in response to being accessed by the scheduler module, the scheduler module accessing the post-test module in response to completion of the test by the run test module.

4. The multi-client test harness of claim 3 wherein the selected test case further comprises a synchronization setup module, the synchronization setup module performing a synchronization setup procedure responsive to being accessed by the scheduler module, the synchronization setup procedure preparing the plurality of computer systems so that the selected test case is executed on the plurality of computer systems at substantially the same time when the scheduler module initiates execution of the selected test case, the scheduler module accessing the synchronization setup module prior to initiating the pre-test module.

5. The multi-client test harness of claim 4 wherein the selected test case further comprises a synchronization cleanup module, the synchronization cleanup module substantially restoring the plurality of computer systems to a state prior that existed prior to the synchronization setup module performing the synchronization setup procedure.

6. The multi-client test harness of claim 1 wherein the selected test case includes a selected run test module, the selected run test module executing a selected test responsive to the selected test case being initiated;

the multi-client test harness includes a next test case, the next test case including a next run test module, the next run test module executing a next test responsive to the next test case being initiated; and the scheduler module initiates execution of the selected test case responsive to a test initiation event, the scheduler module initiating execution of the next test case responsive to a selected test case completion event, the scheduler module synchronizing the executing of the selected and next test cases on the plurality of computer systems.

7. The multi-client test harness of claim 6 wherein the selected test case includes a selected pre-test module, the selected pre-test module performing a selected test case setup procedure responsive to the selected test case being initiated, the selected run test module running the selected test responsive to completion of the selected test case setup procedure; and the next test case includes a next pre-test module, the next pre-test module performing a next test case setup procedure responsive to the next test case being initiated, the next run test module running the next test responsive to completion of the next test case setup procedure.

8. The multi-client test harness of claim 7 further comprising:

a selected setup module, the selected setup module performing a selected synchronization setup procedure responsive to being accessed by the scheduler module, the selected synchronization setup procedure preparing the plurality of computer systems so that the selected test is executed on the plurality of computer systems at substantially the same time when the selected test case is executed, the scheduler module accessing the selected setup module responsive to the test initiation event prior to accessing the selected and next pre-test modules; and a next setup module, the next setup module performing a next synchronization setup procedure responsive to completion of the selected synchronization setup procedure prior to the execution of the selected and next pre-test modules, the next synchronization setup procedure preparing the plurality of computer systems so that the next test is executed on the plurality of computer systems at substantially the same time after the execution of the selected test case.

9. The multi-client test harness of claim 6 wherein the selected test case includes a selected post-test module, the selected post-test module substantially restoring the plurality of computer systems to a selected pre-test state responsive to completion of the selected test; and the next test case includes a next post-test module, the next post-test module substantially restoring the plurality of computer systems to a pre-test state responsive to completion of the next test.

10. The multi-client test harness of claim 1 wherein the plurality of test cases comprises:

a pre-test module, the pre-test module including
a selected pre-test portion for configuring the plurality of computer systems for executing a selected test; and
a next pre-test portion for configuring the plurality of computer systems for executing a next test;

a run test module, the run test module including selected and next run test portions for executing the selected and next tests; and a post-test module, the post-test module including selected and next post-test portions for substantially restoring the plurality of computer systems to a pre-test state after completion of the selected and next tests.

11. The multi-client test harness of claim 1 wherein the computer-readable storage medium is selected for a group consisting of a magnetic disk and an optical disk and a semiconductor-based memory coupled to a computer system.

12. A method of testing compatibility of a first computer system with a second computer system, the method comprising:

providing a test harness on one of a plurality of computer systems, the plurality of computer systems including the first computer system and the second computer system, each of the plurality of computer systems coupled to the others of the plurality of computer systems, the test harness testing compatibility of the first computer system with the second computer system by initiating execution of a first test case on the first and second computer systems in a synchronized manner responsive to a test initiation input, wherein further testing can continue only when execution of the first test case of the first and the second computer systems is complete wherein each additional test case is executed in the same manner as the first test case.

13. The method of claim 12, wherein the providing the test harness comprises:

providing a test file system for receiving the test harness and a test suite; and providing the first test case.

14. The method of claim 13, wherein the test file system resides on at least one of the plurality of computers and is accessible to each of the plurality of computer systems.

15. The method of claim 13, wherein the providing the first test case comprises:

providing a pre-test module, the pre-test module performing a test case setup procedure responsive to the test case being initiated;

providing a run test module, the run test module running a test responsive to completion of the pre-test module; and providing a post-test module, the post-test module substantially restoring the first and second computer systems to a pre-test state responsive to completion of the run test module.

16. The method of claim 15, wherein the providing the first test case further comprises:

providing a setup module, the setup module performing, responsive to the test initiation input, a synchronization setup procedure to ensure that the test case is executed on the first computer system and the second computer system at substantially the same time, the setup module executing responsive to the test initiation input prior to the execution of the pre-test module.

17. The method of claim 13, wherein the providing the test harness comprises:

providing a preparation module to configure the first and second computer systems for executing the test case; and providing a scheduler module, the scheduler module executing the preparation module and the test case responsive to the test initiation input.

18. The method of claim 12, the method further comprising:

providing the test initiation input; and executing, by the test harness, a test case on the first and second computer systems in the synchronized manner responsive to the test initiation input.

19. The method of claim 18, wherein the step of executing the first test case on the first and second computer systems in the synchronized manner comprises:

providing a start signal by the test harness, the start signal indicating to the first and second computer systems a time to start running a test case;

creating a first semaphore by the first computer system after providing the start signal by the test harness;

executing the test case by the first computer system after creating the first semaphore;

removing the first semaphore by the first computer system after executing the test case;

counting a number of semaphores in existence by the first computer system after removing the first semaphore;

determining whether the number of semaphores equals zero after counting the number of semaphores; and returning to counting the number of semaphores if the number of semaphores does not equal zero.

determining whether the number of semaphores equals zero by the first computer system after counting the number of semaphores by the first computer system;

determining whether the number of semaphores equals zero by the second computer system after counting the number of semaphores by the second computer system;

returning to counting the number of semaphores by the first computer system if the number of semaphores counted by the first computer system does not equal zero after determining whether the number of semaphores equals zero;

returning to counting the number of semaphores by the second computer system if the number of semaphores counted by the second computer system does not equal zero after determining whether the number of semaphores equals zero.

returning to the step of providing by the first computer system if the number of semaphores counted by the first computer system equals zero and if another test case is scheduled to be executed;

returning to the step of providing by the second computer system if the number of semaphores counted by the second computer system equals zero and if another test case is scheduled to be executed.

20. The method of claim 18, wherein the step of executing the test case on the first and second computer systems in the synchronized manner comprises:

providing a start signal by the test harness, the start signal indicating to the first and second computer systems a time to start running a test case;

creating first and second semaphores by the first and second computer systems, respectively, after providing the start signal by the test harness;

executing the test case by the first computer system after creating the first semaphore;

executing the test case by the second computer system after creating the second semaphore;

removing the first semaphore by the first computer system after executing the test case by the first computer system;

removing the second semaphore by the second computer system after executing the test case by the second computer system;

counting a number of semaphores by the first computer system after removing the first semaphore;

counting a number of semaphores by the second computer system after removing the second semaphore;

determining whether the number of semaphores equals zero by the first computer system after counting the number of semaphores by the first computer system;

determining whether the number of semaphores equals zero by the second computer system after counting the number of semaphores by the second computer system;

returning to counting the number of semaphores by the first computer system if the number of semaphores counted by the first computer system does not equal zero after determining whether the number of semaphores equals zero;

returning to counting the number of semaphores by the second computer system if the number of semaphores counted by the second computer system does not equal zero after determining whether the number of semaphores equals zero.

21. The method of claim 20, wherein the first and second semaphores are created on one of the plurality of computer systems.

22. The method of claim 20, wherein the executing the test case on the first and second computer systems in the synchronized manner further comprises:

returning to the step of providing by the first computer system if the number of semaphores counted by the first computer system equals zero and if another test case is scheduled to be executed;

returning to the step of providing by the second computer system if the number of semaphores counted by the second computer system equals zero and if another test case is scheduled to be executed.

23. The method of claim 18, wherein the first computer system includes a first test client;

the second computer system includes a second test client;

the plurality of computer systems includes a third computer system, the third computer system providing a status server, the status server including the test harness;

the step of executing the test case on the first and second computer systems in the synchronized manner includes executing the test case by the first and second test clients when the status server indicates that all test clients are ready.

24. The method of claim 23, wherein the step of executing the test case on the first and second computer systems in the synchronized manner further comprises:

indicating ready to the status server by the first test client;

requesting an indication of status of the test clients from the status server by the first test client; and executing the test case by the first test client when the status server indicates all test clients are ready.

25. The method of claim 24, wherein the step of executing the test case on the first and second computer systems in the synchronized manner further comprises:

indicating completion of the test case to the status server by the first test client when the test case has completed executing on the first test client.

26. The method of claim 25, wherein the step of executing the test case on the first and second computer systems in the synchronized manner further comprises:

requesting status of other test clients after indicating test case complete; and requesting a next test case if the server indicates the other test clients have completed the test case.

27. The method of claim 24, wherein the step of executing the test case on the first and second computer systems in the synchronized manner includes requesting the test case to be executed from the status server before indicating ready to the status server by the first test client;

wherein the step of executing the test case by the first test client is performed if a test case is provided by the status server to the test client.

28. The method of claim 27, wherein the step of executing the test case on the first and second computer systems in the synchronized manner further comprises:

registering with the server by the first test client before requesting the test case to be executed by the first test client.

* * * * *